Patented Aug. 9, 1949

2,478,390

UNITED STATES PATENT OFFICE 2,478,390

POLYMERIZATION OF POLYMERIZABLE MONO-OLEFINIC HYDROCARBONS IN THE PRESENCE OF SATURATED ALIPHATIC ESTERS OF INORGANIC OXY ACIDS OF PHOSPHORUS, SULFUR, AND SILICON

William E. Hanford, Short Hills, N. J., and Robert M. Joyce, Jr., Holly Oak, Del., assignors to E. I. du Pont de Nemours & Company, Wilmington, Del., a corporation of Delaware No Drawing. Application December 18, 1947, Serial No. 792,604

12 Claims. (Cl. 260—459)

This invention relates to a new type of reaction and to the products resulting therefrom. This application is a continuation-in-part of our copending application Serial No. 438,466, filed April 10, 1942, now U. S. Patent 2,440,800, issued May 4, 1948.

The novelty of this reaction is such that, for adequate description, it has been found necessary to coin new terms to describe the reaction and the participants therein. The reaction has been called "telomerization" (from Greek telos, meaning "end" plus Greek mer meaning "part"). "Telomerization" is defined as the process of reacting, under polymerization conditions, a molecule YZ which is called a "telogen," with more than one unit of a polymerizable compound having ethylenic unsaturation called a "taxogen" to form products called "telomers" having the formula $Y(A)_nZ$ wherein $(A)_n$ is a divalent radical formed by chemical union, with the formation of new carbon bonds, of $n$ molecules of the taxogen, the unit A being called a "taxomon," $n$ being any integer greater than one, and Y and Z being fragments of the telogen attached to the terminal taxomons.

This invention pertains to the application of this reaction to polymerizable aliphatic monoolefinic hydrocarbons. By the term "polymerizable aliphatic monoolefinic hydrocarbon" is meant any such hydrocarbon which can be polymerized in the presence of benzoyl peroxide.

This novel reaction of a polymerizable aliphatic monoolefinic hydrocarbon, such as ethylene, can be conducted under conditions similar to those used for the polymerization of the hydrocarbon; e. g., those described for the polymerization of ethylene in U. S. Patents 2,133,553, 2,388,225, 2,396,785, 2,395,327, 2,396,677, all filed March 15, 1941. The inclusion in the reaction mixture of the telogen, however, so alters the course of the reaction that there are produced, instead of polyethylene, products differing from polyethylene in chemical composition and having a lower average molecular weight than the polyethylene formed in the absence of the telogen.

Telomerization is not to be confused with interpolymerization. It is known to the art that, under conditions similar to those employed for the polymerization of ethylene as described above, it can be interpolymerized with a wide variety of unsaturated compounds. In this reaction, a number of molecules of each reactant enter into the formation of each polymer chain, and the resulting product is a high molecular weight polymeric material. In telomerization reactions, however, only one molecule of the telogen enters into the formation of each molecular species and the average molecular weight of the product is, in general, considerably lower than that of an interpolymer formed under comparable conditions. Just as in the polymerization of ethylene, a portion of the ethylene can be replaced with another unsaturated compound to form modified polymers or interpolymers, so also in telomerization, a portion of the ethylene can be replaced by another unsaturated compound to form modified telomers. These modified telomers, as in the case of the simple telomers, will contain but one unit of the telogen per molecule of the telomer and will have lower average molecular weights than would have been obtained in the absence of the telogen.

It is an object of this invention to produce new chemical compounds. Another object is to provide a process for reacting a saturated aliphatic ester of an inorganic acid of phosphorus, sulfur, or silicon with more than one unit of a polymerizable aliphatic monoolefinic hydrocarbon to produce telomers. A further object is to discover suitable conditions for this reaction. Other objects will appear hereinafter.

These objects are accomplished by the invention wherein a saturated aliphatic ester of an inorganic oxy acid of a polyvalent nonmetallic element of the class consisting of phosphorus, sulfur, and silicon, i. e., of an element of integral atomic number of 14 to 16 is reacted with a polymerizable aliphatic monoolefinic hydrocarbon under conditions which would normally give rise to polymerization of the latter, in the presence of an agent which is effective as a catalyst for the polymerization of the olefinic hydrocarbon, but ineffective as a catalyst for the Friedel-Crafts reaction; e. g., the reaction of ethyl chloride with benzene. This type of catalyst is termed a free radical type initiator or catalyst (Price, Reactions at Carbon-Carbon Double Bonds, Interscience, New York, 1946, chapter IV). The term "saturated" in the phrase "saturated aliphatic" in the specification and claims means that the aliphatic compound so described is free from aliphatic carbon-to-carbon unsaturation.

In carrying out the process of this invention using a typical aliphatic monoolefinic hydrocarbon, such as ethylene, with a typical saturated aliphatic ester of an inorganic oxy acid of phosphorus, sulfur, or silicon, such as, for example, dimethyl sulfate, it is preferred to operate at superatmospheric pressure, and pressure apparatus must, accordingly, be employed when operating under the preferred conditions. The apparatus consists, in its essential parts, of a pressure reactor capable of being heated, and equipped with means of agitating the reactants, with an inlet line for admitting gaseous ethylene, a vent connected to a safety rupture disc, and a pressure gage. The liquid charge is placed in the reactor, consisting of the saturated ester of the inorganic oxy acid, and inert organic solvent, such as iso-octane, benzene, cyclohexane, etc., and catalyst, which is preferably a diacyl peroxide or an alkali or ammonium persulfate and is generally employed in the amount of about $1/700$ of a molecular equivalent, based on the quantity of telogen employed. The reactor is then closed, the contents are agitated by suitable means such as by stirring with an internal stirrer or by agitating the reactor, and ethylene under pressure is admitted. The amount of ethylene so employed is regulated so that the desired pressure will be achieved at reaction temperature, which is generally somewhere between 60° C. and 150° C. The preferred pressure range is between 20 and 1000 atmospheres, the exact pressure employed depending somewhat upon the reactants used and upon the average molecular weight of product desired.

When benzoyl peroxide is used as catalyst, the reaction usually sets in at about 60° C. to 100° C. as is indicated by a drop in pressure registered on the gage attached to the reactor. It is preferable, although not essential, to maintain the desired reaction pressure by admitting additional ethylene from a storage cylinder as the reaction proceeds. If insufficient agitation is employed, the reaction may be accompanied by a marked temperature rise in the reaction mixture. The use of insufficient diluent in the reaction mixture may occasion such a temperature rise and in the absence of a diluent the reaction may proceed with explosive violence unless carefully controlled.

The end of the reaction is indicated by the cessation of ethylene absorption. When this point is reached, the reaction mixture is allowed to cool, removed from the reactor, and worked up to isolate the resulting products. As a general rule, the telogen is used in excess and a considerable proportion of it remains unreacted at the end of the reaction. Since the telogens of this application are in general water-immiscible liquids, the products are generally soluble in it and may be isolated by evaporating the more volatile telogen from the less volatile products.

It must be emphasized that, in all cases, the products produced by this reaction are not a single molecular species, but are a mixture of structurally homologous compounds differing from one another by one or more taxomons.

The low molecular weight constituents of such telomer mixtures can often be separated into pure organic compounds by fractional distillation. This process is applicable to all telomer mixtures which can be distilled without decomposition. The process is particularly simple because the various constituents of the mixture differ from each other by at least two carbon atoms, leading to fairly large differences in boiling points. Other methods for separating the products can also be used in many cases, e. g., fractional crystallization, sublimation, selective extraction, etc.

Some product mixtures are not readily amenable to separation into their component parts. For a great many applications, however, the product mixture can be employed per se, since it is a mixture of functionally identical compounds differing from one another only in the number of taxomons in the chain between the functional groups.

A very important feature of the process of the present invention when a single telogen and taxogen are used is that it produces a mixture of structurally homologous compounds. This means that the reaction mixture reacts essentially as a pure compound and can be employed as such for many purposes.

For a given ester the average chain length of the telomer mixture depends on the relative concentrations of olefine and saturated ester. Thus increasing the concentration of the olefin relative to that of the ester, for example, by increasing the pressure of the olefine in the reaction mixture or by employing an inert diluent, increases the average molecular weight or chain length of the products.

The average chain length of the product mixture is also a function of the ester employed. In some telomerizations a portion of the product consists of the 1:1 addition compound of ester to olefine. Such compounds are not considered telomers.

In order that the process may be more fully understood, the following specific examples are given by way of illustration, but the invention is not limited thereto as will become more apparent hereinafter.

Wherever the term "parts" is used, it is intended to mean "parts by weight."

*Example I*

A silver-lined pressure reactor is charged with 40 parts of dimethyl sulfate, 100 parts of dioxane, and 0.6 part of benzoyl peroxide. The reactor is closed, evacuated, and pressured with ethylene. The reaction is carried out for 11.7 hours at 90–120° C., a pressure of ethylene varying during the reaction between 400 and 500 atmospheres being maintained within that range by admitting ethylene from a high pressure storage cylinder. After cooling, the product is precipitated by mixture with several volumes of ether and is filtered. There is obtained 33 parts of polyethylene. The filtrate is evaporated to remove the ether, leaving a brown sulfur-containing oil.

This oil is treated with 200 parts of 48 per cent hydrobromic acid in a glass apparatus so designed that the alkyl bromides formed distill with the hydrogen bromide into a separator. There is thus obtained small quantities of alkyl bromides, 60 per cent of which boil in the range of 130–230° C. and the remaining 40 per cent over 230° C. The isolation of these long-chain alkyl bromides proves that an ethylene/dimethyl sulfate reaction product containing in the molecule one dimethyl sulfate unit and a plurality of ethylene units has been formed.

*Example II*

A high pressure tube is charged with 100 parts of dioxane, 50 parts of ethyl orthosilicate, and 0.5 part of benzoyl peroxide. It is then evacuated and charged with ethylene to a pressure of 450 atmospheres. The reactor is then shaken and heated; when the temperature of the mixture reaches about 60° C., a rapid absorption of ethylene, accompanied by a marked rise in temperature, takes place. After the initial reaction has moderated and the temperature has dropped to 100° C., the temperature is maintained at this point, and ethylene is added from a high pressure storage tank from time to time as needed to keep the pressure within the range of 500–1000 atmospheres. After 10 hours, the tube is cooled, the excess of ethylene is bled off, and the product is discharged. The white solid product is separated by filtration and purified by dissolving in toluene, filtering while hot, and allowing the solution to cool to room temperature. The product is filtered and purified further by dissolving in hot toluene, filtering, and precipitating by the addition of methanol. It is a white solid melting at 122–113° C. It contains 1.72 per cent silica (calculated at $SiO_2$) indicating an average molecular weight of about 3500. Products of lower molecular weight, containing larger proportions of silica, are isolated from the toluene-methanol mother liquor.

*Example III*

A mixture of 40 parts of diethyl phosphite and one part of benzoyl peroxide was placed in a stainless steel bomb and ethylene under a pressure of 400 lbs. per sq. in. was added. The temperature was raised to 80° C. and gradually increased to 115° C. during a period of twelve hours. Upon distillation of the product there was obtained 20 parts of diethyl ethane-phosphonate boiling at 98–99° C. at 27–29 mm.; 24 parts of a product boiling at 90–125° C. at 3–7 mm.; 1.6 parts boiling at 125–150° C. at 3 mm.; and 4 parts of higher boiling residue. Refractionation of the fraction boiling at 90–125° C. at 3–7 mm. gave a product boiling at 121° C. at 28 mm. which had the following analysis:

Calculated for $C_8H_{19}O_3P$: C, 49.4%; H, 9.8%; P, 16.0%. Found: C, 50.2%; H, 10.3%; P, 15.9%.

The process of the present invention can be carried out with any polymerizable aliphatic monoolefinic hydrocarbon. The preferred members of this class are those having from 2 to 4 carbon atoms, e. g., ethylene, propylene, and isobutylene, ethylene being especially preferred. It is preferred that the ethylenic unsaturation be at the end of the compound and preferably in the form of a vinyl group

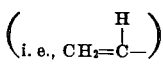

The telogens with which this invention is concerned are the saturated aliphatic esters of inorganic oxy acids of elements of integral atomic number of 14 to 16, i. e., silicon, phosphorus, and sulfur. As examples of these there may be mentioned dibutyl sulfate, tetrabutyl silicate, trimethyl orthophosphate, triethyl orthophosphate, tributyl orthophosphate, triethyl phosphite, tetraethyl silicate, monomethyl sulfate, dimethyl sulfate, and dimethyl sulfite. The preferred group is that of the alkyl and still better the lower (1–4 carbon) alkyl esters of inorganic acids of sulfur, phosphorus, and silicon; more especially alkyl sulfates, phosphates, and silicates.

It is not intended that the invention be limited in scope to telomerizations involving only polymerizable aliphatic monoolefinic hydrocarbons. For example, it is known that ethylene can be interpolymerized with a wide variety of unsaturated compounds. Among such, there may be mentioned propylene, isobutylene, styrene, and similar monoolefinic hydrocarbons; vinyl esters, such as vinyl acetate, vinyl formate, and vinyl isobutyrate; and such acids as acrylic, methacrylic, itaconic, citraconic, crotonic, maleic, and fumaric, as well as their derivatives, such as esters, acid halides, and anhydrides. Other compounds which can be interpolymerized with ethylene include vinyl chloride, vinyl fluoride, tetrafluoroethylene, vinylidine chloride, vinyl cyanide, N-vinyl imides, vinyl ethers, divinyl formal, divinyl butyral, methyl vinyl ketone, and butadiene. Just as the polymerization reaction is applicable to the interpolymerization of polymerizable aliphatic monoolefinic hydrocarbons such as ethylene with other unsaturated compounds, so also is the telomerization reaction applicable to mixtures of polymerizable aliphatic monoolefinic hydrocarbons with other unsaturated compounds, such as those mentioned above, as taxogens. When more than one taxogen is used in the telomerization, the reaction is referred to as "intertelomerization."

While a mixture of telogens can be used in a telomerization reaction, this is generally undesirable because it gives a mixture of products which do not all belong to the same homologous series.

The reaction of the present invention does not occur in the absence of a telomerization, i. e., free radical type, catalyst or initiator. The catalysts used in the process of this invention are agents which are effective as catalysts for the polymerization of ethylene or its homologs and which agents are, at the same time, ineffective as catalysts for the Friedel-Crafts reaction. It must be specifically understood that the process of the present invention is not related to the Friedel-Crafts type reactions and that the Friedel-Crafts type catalysts, such as aluminum chloride, boron trifluoride, sulfuric acid, and hydrofluoric acid, are inoperative for the present process. While the agents used in the present reaction are commonly spoken of as catalysts, it is thought that they do not act as an inert catalyzing agent such, for example, as carbon black, but that they take part in the reaction in some way. In fact, it may be that a better term for these agents would be reaction promoters. However, since reaction promoters have been called catalysts so generally in the art, and since the mechanics of the present process are not clearly established, the term "catalyst" has been employed herein.

Both polymerization of ethylene type compounds and Friedel-Crafts reactions with these same type compounds are so well known that any one skilled in the art will be able, without difficulty, to select a catalyst which would be effective to promote polymerization and ineffective to promote Friedel-Crafts reaction. By way of example, however, the following suitable catalysts are mentioned: peroxygen compounds, e. g., diacyl peroxides such as acetyl peroxide, propionyl peroxide, benzoyl peroxide, and lauroyl peroxide; alkali and ammonium persulfates, perborates, and percarbonates; other peroxides such as hydrogen peroxide, ascaridole, tetrahydronaphthalene peroxide, diethyl peroxide, and cyclohexanone peroxide; molecular oxygen; such metal alkyls as tetraethyllead and tetraphenyllead; ultraviolet light, especially in the presence of such photosensitizers as mercury, alkyl iodides, benzoin, and acetone; amine oxides, e. g., trimethylamine oxide, triethylamine oxide, and dimethylaniline oxide; dibenzoylhydrazine; hydrazine salts such as hydrazine dihydrochloride and hydrazine sebacate; and hexachloroethane. The catalyst is used in amounts varying from about 0.0001 to 1.0 per cent by weight of the telogen, the preferred range in the case of the peroxygen catalysts being 0.05 to 0.5 per cent.

Of this group of catalysts, it is preferred to use peroxygen compounds, especially the diacyl peroxides and the alkali and ammonium persulfates. The other member of the preferred group of catalysts is molecular oxygen, which may be considered a special case of this group. It should be emphasized, however, that, to be effective as a catalyst, molecular oxygen should be present in small quantity, such as, for example, less than 1000 parts per million. As is generally the case in peroxygen catalyzed vinyl polymerizations, oxygen in larger quantities than this has a deleterious effect upon the reaction.

The process of this invention can be carried out over a wide range of temperatures, from room temperature to over 250° C. In fact, the upper temperature limit for the process of this invention is determined only by the thermal stability of the various compounds in the reacting system. The preferred temperature for any given process of this invention depends primarily on the catalyst and the telogen being employed. For the majority of cases, the preferred reaction temperature lies somewhere in the range of 60–150° C. The preferred catalysts, such as the diacyl peroxides and the persulfates, are generally employed in this temperature range, and the preferred classes of telogens react satisfactorily under such conditions. High temperatures are generally employed only with less active esters and catalysts which are more heat stable than those of the preferred class. Processes with less active catalysts and less active esters sometimes require temperatures of the order of 150–250° C.

Superatmospheric pressure is generally desirable for the process of the present invention. This is particularly true in the present invention since, in the preferred embodiments, the olefine is a gas, and it is essential to maintain superatmospheric pressure in order to achieve an appreciable concentration of the olefine in the system. This is not absolutely essential, however, and reactions of the present invention can be carried out at atmospheric pressure. On the other hand, successful reactions can be run as high as 2000 atmospheres pressure, and the ultimate pressure limit for the reaction is only that which the equipment available will stand. The preferred pressure range for the majority of reactions of the present invention is 20–1000 atmospheres.

The ratio of ester to olefine and in the process of this invention can be varied widely. In general, increasing the ratio of ester to olefine decreases the average molecular weight of the product. The preferred molecular ratio of ester to olefine will depend upon the nature of the reactants and the chain length of the product desired, but will generally be in the range of 10:1 to 1:10. It must be emphasized that, especially in the case of ethylene, which is a gas, the average chain length of the product, i. e., the number of ethylene units, is a function of the concentration of ethylene which is maintained in the reaction system, and that this is, in turn, dependent on the reaction pressure. Moreover, the average chain length of the product in a given reaction also depends on the nature of the ester employed, some esters being more active than others. In the final analysis, then, the reaction pressure employed for a given system will depend upon the chain length of product desired and upon the particular ester which is used.

The reaction can be carried out with only the reactants and the catalyst present in the reaction zone. Since the reaction is exothermic and, under some conditions, proceeds with explosive violence, it is desirable, in most cases, to have present an inert diluent which will act to decrease the violence of the reaction and absorb some of the heat. The inert diluent can be a gas such as nitrogen, but, in general, a liquid diluent is used. Inert organic diluents are preferred. It is clear that when the process is carried out in the absence of diluents, the process of this invention, in some respects, is similar to massive polymerization. When an inert solvent is used, the conditions are somewhat similar to so-called solution polymerization.

It has been demonstrated that a solvent, such as isooctane, serves the same purpose as increased pressure in increasing the average chain length of a given product for a given reaction system when the olefine is a gas which is used to maintain the reaction pressure; that is, when one of the reactants is a gas, such as ethylene, it is possible, by the use of a solvent for ethylene, to increase the relative concentration of ethylene with respect to ester and thereby to effect the same result as is brought about by an increase in pressure. As suitable solvents, it is preferred to use relatively low-boiling liquids which are relatively inert under the reaction conditions and which necessarily do not fall in the classification of esters. Among such materials, there may be mentioned aliphatic hydrocarbons, cycloaliphatic hydrocarbons, aliphatic ethers, and cycloaliphatic ethers such as dioxane. Less desirable, although operable, are aromatic hydrocarbons.

While the process can be carried out with less water sensitive esters under conditions similar to aqueous emulsion polymerization, such conditions are in general not preferred.

Although, as has been mentioned above, oxygen in small concentrations can, in the absence of other agents, act as a catalyst for the reaction, its presence in larger quantities is to be scrupulously avoided. This is in agreement with the now generally accepted fact that, in any peroxygen catalyzed vinyl polymerization, oxygen in appreciable quantities has a deleterious effect, not only upon yield, but, in many cases, upon the quality of the product produced. Likewise, in reactions of the present invention it is preferred to reduce the oxygen content of the reaction system to a practical minimum.

The reaction can be carried out in any kind of pressure equipment made of, or lined with, materials capable of withstanding moderate corrosive attack. Such lining materials as stainless steel, silver, nickel, and aluminum, have been found to be particularly useful, although chromvanadium steel can be used. Many other corrosion resistant alloys are, of course, applicable.

It is sometimes desirable to add one or both of the reactants to the system as the reaction progresses. This can be done by injection of the vapor or liquid into the reaction system by well known means. It is also feasible to add a catalyst to the system as the reaction progresses. This can be accomplished, for example, by injecting a solution of the catalyst in one of the reactants or in an inert solvent. This procedure is especially advantageous in those cases where the reaction takes place very rapidly. In such instances, portionwise or slow-continuous addition of the catalyst to the system facilitates the control of the reaction and generally leads to higher yields.

It is within the scope of this invention to carry out the reactions of this invention in a continuous flow system. For example, a mixture of reactants and catalyst can be passed continuously through a zone which is under telomerization conditions. Alternatively, the catalyst can be injected into the system which is passing through the reaction zone. In some cases, advantage may be derived by adding one of the reactants to the mixture in the reaction zone. This is especially true when the reaction is so rapid as to cause a marked change in concentration in one of the reactants. Continuous operation possesses many technical advantages such as economy of operation, accurate control of the reaction, and flexibility of operation. By continuous operation, a constant ratio of reactants can be maintained during the reaction if so desired.

It is apparent from the very broad nature of this invention and the multiplicity of products which can be obtained that a very large number of uses are open to these products. The higher molecular weight waxy products obtained at higher pressures can be used as wax substitutes, coating materials, lubricating oil adjuvants, etc. Again, the low molecular weight products can be separated into their individual components by fractional distillation, and these are very useful as intermediates for a wide variety of syntheses.

It is apparent that many widely different embodiments of this invention may be made without departing from the spirit and scope thereof, and, therefore, it is not intended to be limited except as indicated in the appended claims.

What is claimed is:

1. A process for the preparation of compounds having in the molecule thereof the components of a plurality of molecules of a polymerizable monoolefinic aliphatic hydrocarbon having from two to four carbons and the components of one molecule of a saturated aliphatic ester of an inorganic oxy acid containing only hydrogen, oxygen, and an element of integral atomic number of 14 to 16 which comprises subjecting a reaction mass comprising said olefine and said ester at superatmospheric pressure and a temperature of 60–150° C. to the action of a free radical type polymerization initiator.

2. Process according to claim 1 wherein the ester is an alkyl ester.

3. Process according to claim 2 wherein the olefine is ethylene.

4. Process according to claim 1 wherein the ester is an alkyl sulfate.

5. Process according to claim 4 wherein the olefine is ethylene.

6. Process according to claim 1 wherein the ester is dimethyl sulfate.

7. Process according to claim 6 wherein the olefine is ethylene.

8. A process for the preparation of compounds having in the molecule thereof the components of a plurality of molecules of a polymerizable monoolefinic aliphatic hydrocarbon having from two to four carbons and the components of one molecule of a saturated aliphatic ester of an inorganic oxy acid containing only hydrogen, oxygen, and an element of integral atomic number of 14 to 16 which comprises subjecting a reaction mass comprising said olefine and said ester at superatmospheric pressure and a temperature of 60–150° C. to the action of a peroxy polymerization catalyst.

9. A mixture of products having in the molecule thereof the components of a plurality of molecules of a polymerizable monoolefinic aliphatic hydrocarbon having from two to four carbons and the components of one molecule of a saturated aliphatic ester of an inorganic oxy acid containing only hydrogen, oxygen, and an element of integral atomic number of 14 to 16, said mixture being obtained by the process of claim 1.

10. A mixture of products having in the molecule thereof the components of a plurality of molecules of ethylene and the components of one molecule of a saturated aliphatic ester of an inorganic oxy acid containing only hydrogen, oxygen, and an element of integral atomic number of 14 to 16, said mixture being obtained by exposing a mixture of said olefine and said ester at superatmospheric pressure and at 60–150° C. to the action of a free radical type catalyst.

11. A mixture of products having in the molecule thereof the components of a plurality of molecules of ethylene and the components of one molecule of an alkyl sulfate, said mixture being obtained by exposing a mixture of said olefine and said ester at superatmospheric pressure and at 60–150° C. to the action of a free radical type catalyst.

12. A mixture of products having in the molecule thereof the components of a plurality of molecules of ethylene and the components of one molecule of dimethyl sulfate, said mixture being obtained by exposing a mixture of said olefine and said ester at superatmospheric pressure and at 60–150° C. to the action of a free radical type catalyst.

WILLIAM E. HANFORD.
ROBERT M. JOYCE, Jr.

REFERENCES CITED

The following references are of record in the file of this patent:

UNITED STATES PATENTS

| Number | Name | Date |
| --- | --- | --- |
| 2,402,137 | Hanford et al. | June 18, 1946 |
| 2,407,181 | Scott | Sept. 3, 1946 |
| 2,439,214 | Lindsey | Apr. 6, 1948 |
| 2,440,800 | Hanford et al. | May 4, 1948 |

OTHER REFERENCES

Standinger et al., "Ber. Deutsch Chem. Ges.," vol. 68 (1935), pages 457–459.